Oct. 29, 1940.  H. W. SPURNEY  2,219,374
TRANSPLANTING TOOL
Filed March 29, 1939
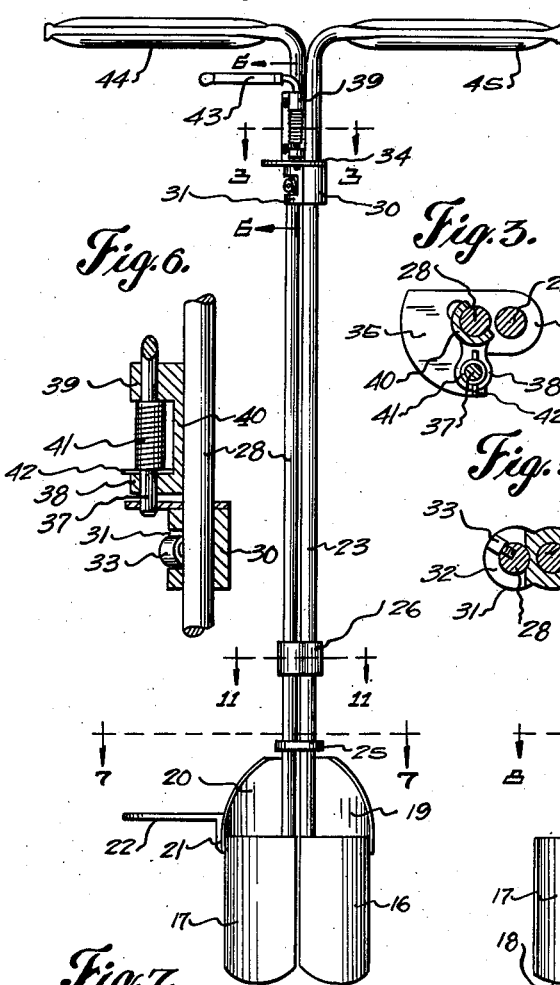
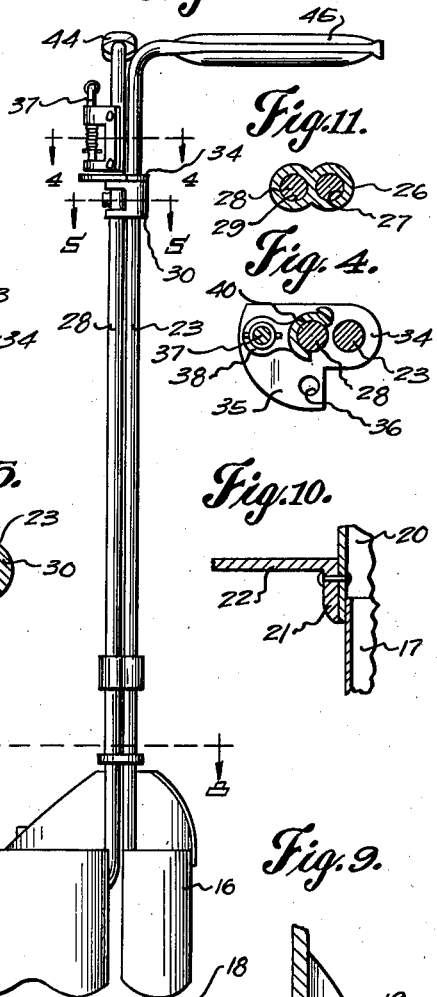
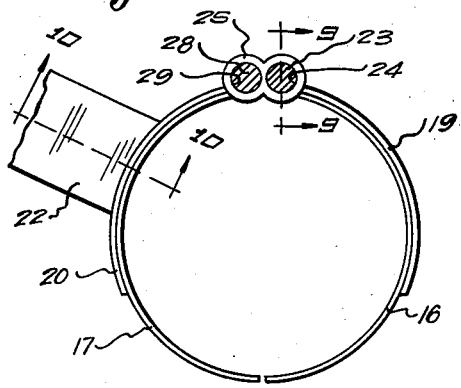
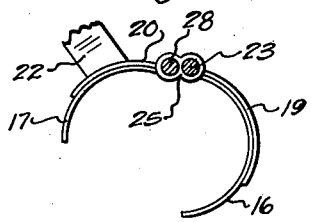
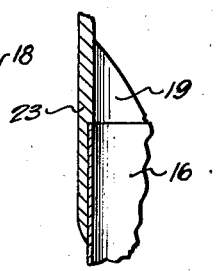
INVENTOR.
HENRY W. SPURNEY
BY
ATTORNEY.

Patented Oct. 29, 1940

2,219,374

UNITED STATES PATENT OFFICE 2,219,374

TRANSPLANTING TOOL

Henry W. Spurney, Detroit, Mich.

Application March 29, 1939, Serial No. 264,804

3 Claims. (Cl. 294—50.7)

My invention relates to a new and useful improvement in a transplanting tool adapted for use particularly in removing plants from the ground and transplanting the same in pots or containers. In this transplanting operation, it is desirable that the roots of the plant be disturbed as little as possible which necessitates removal of the plant with a considerable amount of earth in which the roots are embedded. I am aware that various tools have been originated to perform such work but various disadvantages reside in such tools.

It is an object of the present invention to provide a transplanting tool which will be simple in structure, economical of manufacture, light, durable, compact and easily operated.

Another object of the invention is the provision of a tool of this class so arranged and constructed that the earth removed by the tool may be easily and quickly released for deposit in a pot or similar container with a minimum disturbance of the earth so deposited in the container.

Another object of the invention is the provision of a tool of this class so arranged and constructed that it may be placed in embracing relation on the stalk of a tall plant without necessitating movement downwardly from the top thereof which would result in injury to the branches.

Another object of the invention is the provision of a tool of this class of a tubular digging member formed sectional and so arranged and constructed that the sections may be brought into closed position for digging purposes and then separated for releasing the earth contained in the tubular digging member.

Another object of the invention is the provision of a tool of this class having a tubular digging member formed from sections swingable relatively to each other and provided with means for securing the sections in closed or engaging position.

Other objects will appear hereinafter.

It is recognized that various modifications and changes will be made in the structure of the tool without departing from the spirit of the invention and it is intended that such variations and modifications shall be brought within the claims appended hereto.

I have illustrated one form of the invention and for the purposes of clarification, I have set out in the drawing various illustrations of the invention, in which drawing, Fig. 1 is an elevational view of the invention showing the digging member in closed position, Fig. 2 is an elevational view of the invention showing the sectional digging member in separated relation, Fig. 3 is a sectional view taken on line 3—3 of Fig. 1, Fig. 4 is a sectional view taken on line 4—4 of Fig. 2, Fig. 5 is a sectional view taken on line 5—5 of Fig. 2, Fig. 6 is a fragmentary view taken on line 6—6 of Fig. 1, Fig. 7 is a sectional view slightly enlarged taken on line 7—7 of Fig. 1, Fig. 8 is a sectional view taken on line 8—8 of Fig. 2, Fig. 9 is a sectional view taken on line 9—9 of Fig. 7, Fig. 10 is a fragmentary sectional view taken on line 10—10 of Fig. 7, Fig. 11 is a sectional view taken on line 11—11 of Fig. 1.

The digging element comprises a pair of substantially semi-circular sections 16 and 17 having the sharpened digging edge 18 provided with the curved surfaces as shown in Figs. 1 and 2. Secured to and projecting upwardly from the upper edge of each of these sections 16 and 17 are the attachment plates 19 and 20. Secured to the plate 20 and also to the section 17 is the depending portion 21 of a bracket, the other portion 22 of which projects outwardly from the digging element and serves as a presser member on which the foot may be placed to press the digging member into the earth.

Secured to the edge of the plate 19 and also to the section 16 is an upwardly projecting rod 23. This rod 23 projects through an opening 24 formed in a guide plate 25, this guide plate being secured to the rod and to the attachment plate 19 in fixed relation thereto. Mounted on the rod 23 is a sleeve 26 having a passage 27 therethrough through which the rod 28 projects this passage 27 serving as a bearing for the rod 28. This rod 28 also projects through the opening 29 formed in the plate 25 which also serves as a bearing for the rod 28, the lower end of the rod 28 being secured to the edge of the attachment plate 20 and the section 17. These two rods 23 and 28 extend parallel in closed relation to each other and adjacent upper end of the rod 23 is fixedly mounted a sleeve 30 through which the rod 23 projects. This sleeve 30 carries the sleeve 31 which extends parallel thereto and through which the rod 28 is rotatably projected. The sleeve 30 is cut away as at 32 to provide a slot in which may ride the stud 33 which is threaded at one end into the rod 28 and projects outwardly therefrom. Fixedly mounted on the rod 23 and on the sleeve 30 is a plate 34 through which the rod 28 projects. An outwardly extended portion 35 of this plate is provided with an opening 36 in which may engage one end of a plunger 37 which is slidably projected through spaced sleeves 38 and 39 carried by the bracket 40 which is fixedly mounted on the rod 28. Positioned in embracing relation on the plunger 37 which serves as a latch bolt and lying between the sleeves 38 and 39 is a coil spring 41, one end of which engages the face of the sleeve 39 and the other end of which engages the cotter pin 42 projected through the latch bolt or plunger 37. The upper end of this plunger or latch bolt 37 is angularly turned to provide a handle 43 which normally extends parallel to and in slightly spaced relation from the angularly turned handle 44 carried by the upper end of the rod 28. The handle 45 is carried by the upper end of the rod 23.

The construction is such that when the latch bolt 37 is projected into the opening 36 a relative rotation of the rods 23 and 28 is prevented. However, an operator while grasping the handles 44 and 45 may, with the fingers of one hand, grasp the handle 43 and draw the latch bolt out of the opening 37, whereupon the rods 23 and 28 may be relatively rotated, the rod 28 rotating in the parts through which it is projected as a bearing. When the handles are brought into alignment as shown in Fig. 1 and the latch bolt is in engagement in the opening 36, the edges of the sections 16 and 17 will be substantially in engagement with each other as shown in Fig. 7 to provide a substantially tubular digging element. It is believed obvious that the digging element need not be circular in cross-section. When in the position shown in Fig. 7, the tool may be pressed into the earth around a plate and lifted upwardly bringing with it the quantity of earth with which it has been brought into embracing relation. This earth may then be carried to the place of deposit in order to place the earth and the plant in a pot or other suitable receptacle. When positioned over the pot or receptacle, the plunger 37 would be retracted from the opening 36 and the handle 44 used to rotate the rod 28 swinging the sections 16 and 17 relatively to each other so that the tubular digging member is opened up as shown in Fig. 8, thus permitting the earth embraced thereby to be deposited in the pot or receptacle in which it is desired to place the same. The latch bolt prevents this relative movement of the member 16 and 17 while the earth is being moved to the pot or receptacle in which it is desired to deposit so that undue dropping of the plant with the earth around the roots is prevented.

Frequently, it is desirable to transplant plants of considerable height and on which outwardly projecting branches have formed. To move the digging element downwardly over the stalk of the plant while the digging element is in the position shown in Fig. 7 might result in injury to the outwardly projecting branches. In order to envelop the stalk of the plant, it would be but necessary to swing the sections into open position as shown in Fig. 8 and then, after embracing the stalk adjacent the earth, swing these sections into closed or digging position.

By this structure, I have provided a transplanting tool which will execute the proper removal of the plant with sufficient earth around the roots to prevent injury to the plant and assure a successful transplanting. With this tool a quick and easy operation becomes possible, and it is believed obvious that the tool may be economically manufactured, and that it is durable, possessed of a minimum number of parts, and at the same time, light, and easy to operate. It is believed obvious that the tool may be made of various sizes, both as to the diameter of the digging elements, the length of the rods, etc.

In the specification and claims, I have referred to the tool as a transplanting tool. It might also be termed a planting shovel, because its use not only relates to the removal of plants from the earth in which they have grown, but also to the planting of the removed plants. When the plant has been removed from the earth in which it has grown, it may be placed in a pot or receptacle, or it may be planted in the earth at another location. It is obvious that when it is put to such use, the hole at the new location will be dug for the reception of the plant. This hole would, of course, be dug with the invention, and then the plant, after being removed from the earth where it has grown, would be transported to the dug hole, and deposited or planted in the earth at the new location. Thus, it becomes possible to dig up a plant and transplant it at a new location, and by digging the hole with the same planting shovel, or invention illustrated, herein, there would be carried with the replanted plant the proper amount of properly packed earth to fill the hole in which it is to be planted. Thus, the invention lends itself for replanting a plant without in any manner disturbing the earth around the roots of the plant, and without making it necessary to deposit any loose earth in the hole in which the plant would be replanted. It is obvious that such replanting maintains the plant in the same condition when replanted, as it merely continues its growth. Moreover, when the hole in which the replanted plant is to be deposited is dug with the same tool that is used for digging up the plant, there is a uniform depth maintained, and the plant when replanted is in the same location of depth as it had arrived at before replanted. This makes it possible to replant a number of plants from other locations and maintain the same level of growth of the plants, which they had originally. This is an important feature, for the proper amount of earth around the roots of the plants must be maintained, as it leaves the roots covered, and that amount of earth which they naturally penetrate must therefore be the proper level of depth.

What I claim as new is:

1. A transplanting tool of the class described, comprising: a digging element embodying a pair of relatively movable sections, said sections being movable into open and closed position and adapted, upon movement to closed position, for forming a substantially tubular digging body; a pair of rods extended in close parallel relation to each other, each of said rods being connected, adjacent its lower end to one of said sections; a plurality of bearing members fixedly mounted on one of said rods intermediate the ends thereof, the other of said rods being rotatably projected through said bearing members to provide journals therefor intermediate the ends of said rotatable rod; a handle on the upper end of each of said rods; a plate carried by and projecting outwardly from the upper of said bearings and having an opening formed therethrough; an axially movable latch member carried by said rotatable rod adjacent its upper end and adapted for projecting through said opening for securing said rods in fixed relation; a spring for resisting withdrawal of said latch member out of said opening; and a handle on said latch member extending outwardly therefrom beneath the handle on said rotatable rod for withdrawing said latch member out of engagement with said opening.

2. A transplanting tool of the class described, comprising: a digging element embodying a pair of relatively movable sections, said sections being movable into open and closed position and adapted, upon movement to closed position, for forming a substantially tubular digging body; a pair of rods extended in close parallel relation to each other, each of said rods being connected, adjacent its lower end to one of said sections; a plurality of bearing members fixedly mounted on one of said rods intermediate the ends thereof, the other of said rods being rotatably projected through said bearing members to provide journals therefor intermediate the ends of said rotatable rod; a handle on the upper end of each of said rods; a securing member carried by and projecting outwardly from the upper of said bearings and having an opening formed therethrough; an axially movable latch member carried by said rotatable rod adjacent its upper end and adapted for projecting through said opening for securing said rods in fixed relation; a spring for resisting withdrawal of said latch member from said opening; a laterally projecting handle on said latch member extending parallel to and in spaced relation from the handle on said rotatable rod for, upon movement toward said handle, withdrawing said latch member out of engagement with said opening.

3. A transplanting tool of the class described, comprising: a digging element embodying a pair of relatively movable sections, said sections being movable into open and closed position and adapted, upon movement to closed position, for forming a substantially tubular digging body; a pair of rods extended in close parallel relation to each other, each of said rods being connected, adjacent its lower end to one of said sections; a plurality of bearing members fixedly mounted on one of said rods intermediate the ends thereof, the other of said rods being rotatably projected through said bearing members to provide journals therefor intermediate the ends of said rotatable rod; a handle on the upper end of each of said rods; an abutment member carried by said rotatable rod and projecting outwardly from the periphery thereof, said upper bearing having a cut-away portion for reception of said abutment member, said abutment member upon engagement with the ends of said cut-away portion preventing further rotation of the rotatable rod.

HENRY W. SPURNEY.